Oct. 15, 1968  H. E. JORDAN  3,406,323
SYNCHRONOUS MACHINE WITH SINGLE ROTOR
Filed March 23, 1966  2 Sheets-Sheet 1

INVENTOR
HOWARD E. JORDAN
BY Woodling, Krost,
Granger and Rust
ATTORNEYS

Oct. 15, 1968

H. E. JORDAN 3,406,323

SYNCHRONOUS MACHINE WITH SINGLE ROTOR

Filed March 23, 1966

INVENTOR

HOWARD E. JORDAN

BY Woodling, Krost,
Granger and Rust

ATTORNEYS

United States Patent Office 3,406,323
Patented Oct. 15, 1968

3,406,323
SYNCHRONOUS MACHINE WITH SINGLE ROTOR
Howard E. Jordan, Euclid, Ohio, assignor to Reliance Electric and Engineering Company, a corporation of Ohio
Filed Mar. 23, 1966, Ser. No. 536,840
22 Claims. (Cl. 318—185)

ABSTRACT OF THE DISCLOSURE

The disclosure relates to a synchronous machine such as motor having first and second stator windings and first and second rotor windings. The first windings act as a synchronous motor and the second windings act as an exciter. In one example the first stator winding is two pole, three phase and the second stator winding is four pole, three phase; the first rotor winding is two pole, two phase and the second rotor winding is four pole, three phase. The rotor windings are interconnected by rectifiers to supply the voltage generated in the rotor exciter winding to the rotor first winding as a field winding of the synchronous motor. The different number of poles in the first and second stator windings permits the second windings to act as a frequency converter to generate a voltage in the rotor second winding and cause the motor to pull in to synchronism with the rotating field of the stator first winding. The foregoing abstract is merely a resume of one general application, is not a complete discussion of all principles of operation or applications, and is not to be construed as a limitation on the scope of the claimed subject matter.

The invention relates in general to a synchronous machine and more particularly to an excited field, brushless, synchronous motor or generator.

Brushless, excited field synchronous machines have been proposed in the past. In general these have incorporated two separate magnetic structures for each of the stator and rotor of the machine with the two separate rotor structures in line along a rotating shaft. In such prior art construction, one rotor core was for the motor and the other for the exciter, and considerably greater bulk was required as well as a more costly unit with more magnetic core material and more winding material used. Also some attempts have been made to use a single rotor core but such attempts have been limited to using a squirrel-cage rotor on the winding core which has been mutilated or cut apart into sections and then interconnected by rectifiers. The squirrel-cage segments have been used to provide starting torque for the synchronous motor. At synchronous speed a separate, comletely unrelated frequency had to be impressed on the stator windings so as to induce an alternating voltage in the squirrel cage segments. This alternating voltage was rectified to produce a unidirectional current through this squirrel-cage winding so as to develop unidirectional poles for synchronous motor action. This has required complicated systems for two separate frequencies applied to the stator windings wherein neither frequency is a harmonic of the other. This precludes using only commercial frequencies such as 60 cycle source frequencies. Such a system is shown in the E. M. Pell Patent 2,969,491.

The present invention relates to a synchronous machine wherein only a single rotor core and only a single stator core is used and the magnetic flux for the synchronous motor as well as the exciter are both contained within the single rotor core. Several systems are shown for assuring magnetic isolation between the magnetic flux required for synchronous motor operation and the magnetic flux required for exciter operation so that interaction of the two produces no deleterious effects. In the preferred embodiment the exciter is a frequency converter wherein a voltage is induced in winding means on the rotor by a relative rotation of such winding means and the magnetic field of the frequency converter stator winding. As a result the exciter or frequency converter will develop a voltage therein at the synchronous speed of the motor. This induced voltage is then rectified by rectifier elements rotating with the rotor and applied to a rotor winding producing a DC field to assure synchronous motor action.

Accordingly an object of the present invention is to provide a synchronous machine which obviates the above mentioned disadvantages of the prior art.

Another object of the present invention is to provide a brushless, excited field synchronous machine with single stator and rotor cores.

Another object of the invention is to provide a brushless, excited field synchronous machine with a single stator and rotor core wherein two different fluxes are combined yet there is magnetic isolation for the synchronous motor action and the exciter action.

Another object of the invention is to provide a brushless, excited field, synchronous machine having a synchronous motor and a frequency converter each with rotor windings on a single rotor core and interconnected by rectifiers, with said frequency converter operating in accordance with the relative rotation of the converter rotor windings and the rotating field of the stator windings.

Another object of the invention is to provide a brushless, excited field synchronous machine wherein a single rotor core is used, the rotor having distributed windings for electrical and magnetic balance.

Another object of the invetion is to provide an excited field, brushless synchronous machine having a rotor core with distributed windings on a rotor which has salient poles.

Another object of the invention is to provide an excited field, brushless synchronous machine with an exciter and motor stator windings having a different number of poles, and pole phase groups for either winding connected in series to eliminate any voltage developed by the mutual magnetic coupling between the motor and exciter windings.

Another object of the invention is to provide a synchronous machine with stator windings for motor action and for exciter operation wherein any polyphase or single-phase stator winding for the motor may be used and any polyphase secondary for the motor may be used and polyphase or single phase or DC excitation may be used for the exciter.

Another object of the invention is to provide a synchronous machine with stator and rotor windings for motor action and stator and rotor windings for exciter action with the use of a bidirectional controlled rectifier to supply energy from the exciter rotor winding to the motor rotor winding such that alternating current flows in the motor rotor winding during starting and direct current flows in the motor rotor winding during operation at synchronous speed.

The invention may be incorporated in a synchronous machine, comprising, in combination, stator core means, a single rotor core journalled relative to said stator core means, stator winding means wound on said stator core means, rotor winding means on said single rotor core, at least a part of said stator and rotor winding means acting as a synchronous machine operable at a synchronous speed dependent on the number of poles in said stator winding means and with said part of said rotor winding means acting as a field winding, at least a part of said stator and rotor winding means operable as an exciter to generate a voltage in the rotor exciter winding, rectifier means connecting said rotor exciter and field windings, and said generated voltage being rectified by said rectifier means and applied to said rotor field winding to cause operation of said machine at said synchronous speed.

Other objects and a fuller understanding of the invention may be had by referring to the following description and claims, taken in conjunction with the accompanying drawings, in which:

Figure 1:
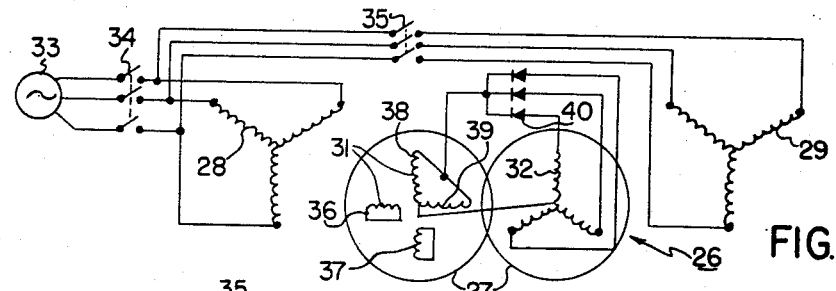
FIGURE 1 is a schematic diagram of a synchronous motor embodying the invention.

FIGURE 1 illustrates one embodiment of the invention which is directed to a synchronous motor as an example of a synchronous machine 26. This machine has a stator of ordinary construction and a single rotor core illustrated by the overlapping circles 27. The stator has stator winding means illustrated as a first and second stator winding 28 and 29, respectively. The single rotor core is journalled relative to the stator and has rotor winding means illustrated as first and second rotor windings 31 and 32, respectively.

The first windings on the stator and rotor, windings 28 and 31, act as motor windings and the second windings 29 and 32 act as exciter windings. The first stator winding 28 may be a primary winding and the first rotor winding 31 may be a secondary winding. The first stator winding 28 is illustrated as a polyphase winding namely a three-phase winding energized from a voltage source 33 through a main switch 34. The second stator winding 29 is also illustrated as a polyphase winding in this case a three-phase winding also energized from a suitable voltage source. In this case the second stator winding 29 is energized from the same voltage source 33 through a switch 35.

The first rotor winding 31 is illustrated as a two-phase winding and includes first and second coils 36 and 37 which are short circuited upon themselves and thus act as short-circuited secondary windings to provide starting torque to the motor rotor as an induction motor. The first rotor winding 31 also includes third and fourth coils 38 and 39, respectively, which are connected in parallel.

The second rotor winding 32 is illustrated as a three-phase Y-connected winding. The ends of the Y are connected through rectifiers 40 which for ruggedness may be solid state rectifiers, to one terminal of the paralleled coils 38 and 39 and the mid-point of the winding 32 is connected to the other terminal of the paralleled coils 38 and 39.

The motor primary may be a two-pole, three-phase primary winding, for example, and the first rotor winding 31 may be a two-pole two-phase winding. The second stator winding 29 may be a four-pole, three-phase winding and the second rotor winding also may be a four-pole, three-phase winding. If the voltage source 33 is a 60 cycle source, for example, then closing of the main switch 34 will energize the first stator winding 28 to produce a rotating magnetic field at 3600 r.p.m. The single rotor core 27 will then be swept by this rotating magnetic field, inducing a voltage in the coils 36 and 37 as well as in the coils 38 and 39 which are short circuited upon themselves, and this will develop induction motor starting torque to accelerate the motor to induction motor speed with a small slip. The coils 36–39 have been illustrated in a quadrature arrangement suitable for winding in a two-pole configuration. Because of the polyphase winding configuration of the first rotor winding 31, the motor will accelerate in excess of the one-half synchronous speed point up to the usual induction motor running speed of about 3500 r.p.m.

The exciter switch 35 may be closed at the same time that the main switch 34 is closed or alternatively it need not be closed until the motor is up to induction motor speed. In either event the energization of the second stator winding 29 will establish a four-pole rotating magnetic field, and with the assumed 60 cycle frequency this will be rotating at 1800 r.p.m. The rotor core 27 is being magnetically driven by the action of the first rotor winding 31 at about 3500 r.p.m. and accordingly this produces a difference in speed or angular velocity between the rotating magnetic field of the second stator winding 29 and the poles of the second rotor winding 32. Accordingly the exciter 29–32 acts as a frequency converter, inducing a voltage in the second rotor winding 32 in accordance with this difference in rotational speeds. This induced voltage is rectified by rectifiers 40 and applied to the coils 38 and 39 of the first rotor winding 31. This then develops a unidirectional current flow to establish unidirectional magnetic poles in the rotor core 27. This is the necessary field excitation to make the motor 26 pull-in to run as a synchronous motor. It has been found that there is adequate pull-in torque and pull-out torque as well as adequate starting torque under induction motor principles.

Figure 2:
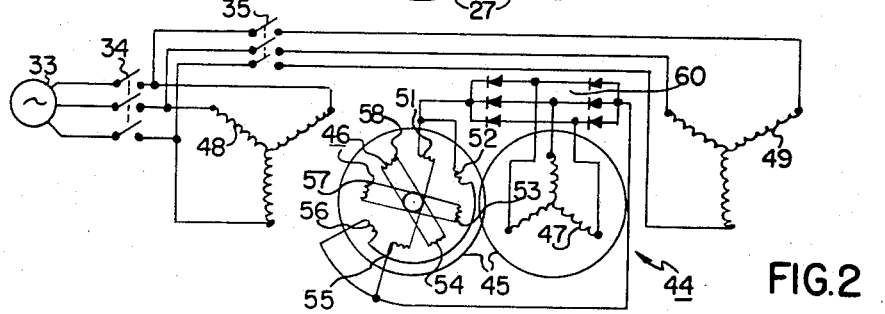
FIGURES 2–5 are schematic diagrams of further modifications of the invention.

FIGURE 2 illustrates a modification of the invention. In this case a synchronous machine 44 is shown which again may be a synchronous motor. The first and second stator windings 48 and 49 may again be mounted on a single stator core and be three phase energized from the three-phase source 33. The single rotor core 45 has again been illustrated as overlapping circles to illustrate the fact that both of these windings within the two circles may be mounted on a single magnetic core structure. The single rotor core 45 includes a first rotor winding 46 and a second rotor winding 47. The first rotor winding 46 is similar to the first rotor winding 31. The first rotor winding 46 again acts as the motor starting and field winding in conjunction with the first stator winding 48. This first rotor winding 46 is a four-pole, two-phase winding whereas stator winding 48 is a four-pole, three-phase winding. The first rotor winding 46 is made up of two phase groups of four coils each. Coils 51, 53, 55, and 57 are of one phase and coils 52, 54, 56, and 58 are of the second phase. Coils 53 and 57 of the first phase are short circuited upon each other and coils 54 and 58 of the second phase are short circuited upon each other. Coils 51 and 55 of the first phase are connected in series and connected to the output of a three-phase bridge rectifier 60, supplied from the second rotor winding 47. Coils 52 and 56 are of the second phase and are connected in series and connected across the output of this bridge rectifier 60. The second stator winding 49 and second rotor winding 47, constituting the exciter, operate as a frequency converter and are wound as two-pole, three-phase windings.

With the main switch 34 closed, energization of the first stator winding 48 will cause flux to sweep the first rotor winding 46. Because of the short circuited two-phase coils 53, 57 and 54, 58, the motor 44 will start as an induction motor and come up to induction motor speed of for example, 1750 r.p.m. assuming a 60 cycle line frequency. Energization of the second stator winding 49 by closing switch 35 will establish a two-pole rotating field which in this example will be 3600 r.p.m. This may be either forward or backward relative to the rotation of the rotor, for either 1800 or 5400 relative rotations per minute. Accordingly exciter 47–49 acts as a frequency converter and a voltage is induced in the second rotor winding 47, is rectified and applied to the coils 51, 55 and 52, 56 of the first rotor winding 46. This establishes a unidirectional current in these windings for a unidirectional flux in the rotor core 45. Accordingly the motor 44 will pull in to synchronous speed of 1800 r.p.m. and run as a synchronous motor.

Figure 7:
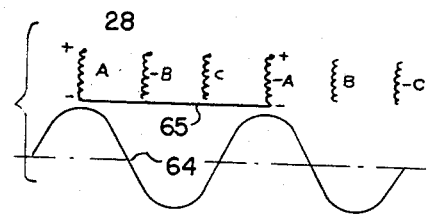
FIGURES 7 and 8 are voltage diagrams indicating the magnetic isolation.
Figure 8:
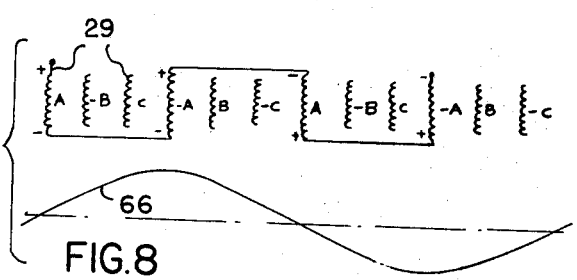

In the case of both FIGURE 1 and FIGURE 2 the development of two different magnetic fields in a single rotor core 27 or 45 and in the single stator core is permissible if there is magnetic isolation or independence between the motor action and the exciter action in each of the stator and rotor cores. FIGURES 7 and 8 illustrate this magnetic isolation. In FIGURE 7 the two sets of coils A, B, and C illustrate the three phase windings of the stator winding 28 which is a two-pole, three-phase winding. Sine-wave 64 illustrates the four-pole magnetic field established by the second stator winding 29. A conductor 65 interconnects the negative ends of the two A phase coils of stator winding 28. It will be noted that in tracing through the series circuit of the two A phase coils, there is first a voltage drop and then a voltage rise at that particular instant caused by the voltage induced therein from the four-pole field. Accordingly because of this series connection the net voltage appearing across the terminals of the A phase of the two pole stator winding is zero. The B phase coils are similarly interconnected in series and will also have zero voltage developed thereacross. Similarly the C coils will be connected in series and will have zero voltage induced across this series combination.

FIGURE 8 illustrates the three phase groups of coils A, B, and C constituting the four-pole, three-phase stator winding 29. Comparing the positions of these coils with the field produced by the two-pole stator winding 28, illustrated by curve 66, it will be observed that a net voltage of zero is induced across each phase group of winding 29 from the two-pole field 66. Because winding 29 is a four-pole winding there are four coils in each phase group. These are connected in series in the manner shown in FIGURE 8. It will be observed that at any instant there are two voltage rises and two voltage drops for a total voltage of zero induced into the second stator winding 29 by this two-pole field 66 of the first rotor winding 28. It will be noted that the induced voltage has been considered solely upon the relative space positions of the windings and the fields and is independent of any relative motion between the two. It is, therefore, equally valid for both stator and rotor windings. Also the argument is valid for all phases of a single or polyphase system because the net voltage is shown to be zero for any one of the phases.

A general equation may be established with regard to the number of poles between the first and second stator windings. This general equation shows that many practical ratios of poles of the first and second windings may be used without any magnetic interference. The general equation is based upon $e=Blv$ wherein the induced voltage is equal to the flux density B times the length of the conductor $l$ times the velocity $v$ of the conductor.

Let the inducing wave $=\sin rx$,
where
$r=1$ for 2 pole
$r=2$ for 4 pole
$r=3$ for 6 pole, etc.

Let the receiving winding have coils at:

$$\frac{a}{s}, \frac{(a+60°)}{s}, \frac{(a+120°)}{s}, \frac{(a+180°)}{s}, \frac{(a+240°)}{s}, \frac{(a+300°)}{s}$$

where
$s=1$ for 2 pole
$s=2$ for 4 pole
$s=3$ for 6 pole, etc.

In general, in one pole phase group, there are coils at:

$$\frac{a}{s}, \frac{a+180°}{s}, \frac{a+2\times180°}{s}, \ldots \frac{a+kn180°}{s}$$

where $kn=2s-1$.

The voltage induced in the receiving coils is proportional to $$\sin \frac{ra}{s} + (-1)^1 \sin \frac{r(a+180°)}{s} +$$

$$(-1)^2 \sin \frac{r(a+2\times180°)}{s} + \ldots (-1)^{kn} \sin \frac{r[a+kn180°]}{s}$$

where $kn=2s-1$.

In a specific case, as illustrated in FIGURE 1, let
$r=1$ (2 pole)
$s=2$ (4 pole)
$2s-1=3$, then:

$$V=\sin \frac{a}{2} + \sin \left(\frac{a+180°}{2}\right)$$

$$+\sin \left(\frac{a+2\times180°}{2}\right) + \sin \left(\frac{a+3\times180°}{2}\right)$$

$$V=\sin \frac{a}{2} - \sin \left(\frac{a}{2}+90°\right)$$

$$+\sin \left(\frac{a}{2}+180°\right) - \sin \left(\frac{a}{2}+270°\right)$$

$$V=\sin \frac{a}{2} - \cos \frac{a}{2} - \sin a/2 + \cos a/2 = 0$$

or zero induced voltage.

In the specific case as illustrated in FIGURE 2, let
$r=2$ (4 pole)
$s=1$ (2 pole)
$2s-1=1$ $$V=\sin \frac{2a}{1} - \sin \frac{2(a+180°)}{1} = \sin 2a - \sin (2a+360°) = 0$$

or zero induced voltage.

In another specific example, of a ratio of poles of 3:2, let
$r=2$ (4 pole)
$s=3$ (6 pole)
$(2s-1)=5$ $$V=\sin 2a/3 - \sin \frac{2(a+180°)}{3}$$

$$+\sin \frac{2(a+2\times180°)}{3} - \sin \frac{2(a+3\times180°)}{3}$$

$$+\sin \frac{2(a+4\times180°)}{3} - \sin \frac{2(a+5\times180°)}{3}$$

$$V=\sin \frac{2a}{3} - \sin \left(\frac{2a}{3}+210°\right) + \sin \left(\frac{2a}{3}+240°\right)$$

$$-\sin \left(\frac{2a}{3}+360°\right) + \sin \left(\frac{2a}{3}+480°\right) - \sin \left(\frac{2a}{3}+600°\right)$$

$$V=\sin \frac{2a}{3} - \sin \left(\frac{2a}{3}+120°\right) + \sin \left(\frac{2a}{3}+240°\right)$$

$$-\sin \frac{2a}{3} + \sin \left(\frac{2a}{3}-120°\right) - \sin \left(\frac{2a}{3}-240°\right) = 0$$

again producing zero induced voltage.

For another specific example, let the ratio of poles be 4:1. Let
$r=1$ (2 pole)
$s=4$ (8 pole)
$2s-1=7$ $$V=\sin \frac{a}{4} - \sin \frac{a+180°}{4} +$$

$$\sin \left(\frac{a+2\times180°}{4}\right) - \sin \left(\frac{a+3\times180°}{4}\right) -$$

$$\sin \left(\frac{a+4\times180°}{4}\right) - \sin \left(\frac{a+5\times180°}{4}\right) +$$

$$\sin \left(\frac{a+6\times180°}{4}\right) - \sin \left(\frac{a+7\times180°}{4}\right)$$

$$V=\sin \frac{a}{4} - \sin \left(\frac{a}{4}+45°\right) + \sin \left(\frac{a}{4}+90°\right) -$$

$$\sin \left(\frac{a}{4}+135°\right) + \sin \left(\frac{a}{4}+180°\right) - \sin \left(\frac{a}{4}+225°\right) +$$

$$\sin \left(\frac{a}{4}+270°\right) - \sin \left(\frac{a}{4}+315°\right)$$

again for zero induced voltage.

The solutions of the above equations show that many practical ratios of poles may be used. Specifically it has been found that the following ratios of poles are satisfactory because these ratios will not induce a voltage into the lower number of poles from the higher number of poles nor will they induce a voltage into the higher number of poles from the lower number of poles.

2:1, 4:1, 6:1, etc.
3:2, 5:2, 7:2, etc.
4:3, 6:3,
5:3, 7:3,
5:4, 7:4,
6:5,
7:5,

It will be noted that the above list deletes ratios of 3:1, 5:1, 7:1, and the like which do induce a voltage in series connected coils of a phase group but that such list does provide many different ratios of poles which work satisfactorily.

Figure 6:
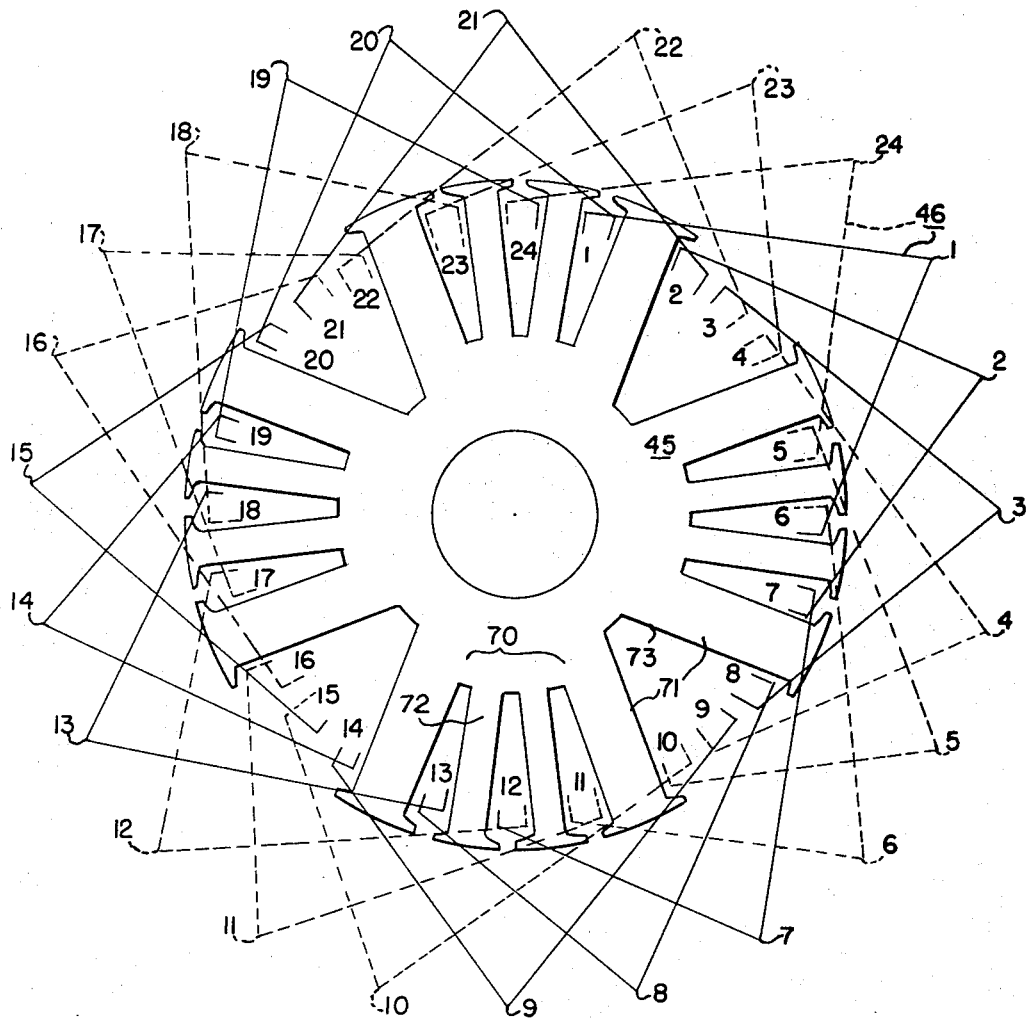
FIGURE 6 is a plan view of one of the rotor laminations with the winding diagrammatically illustrated thereon.

FIGURE 6 illustrates an end view of the single rotor core 45, or one lamination thereof, which has been found satisfactory for a distributed, graded winding for the first rotor winding 46 and to receive the second rotor winding 47 as a distributed winding. The first rotor winding 46 is shown on this FIGURE 6. The rotor core 45 is shown with four generally salient poles 70 each having four teeth. The outermost teeth 71 are wider than the inner teeth 72 in order to provide a proper balance between core material and winding material and to carry the necessary flux. The teeth 71 and 72 are so proportioned that if just the inner teeth 72 were provided there would be 24 equal teeth and 24 slots. The four salient poles are created by in effect removing two teeth to form an enlarged slot 73 and then enlarging the two outer teeth 71 adjacent such enlarged slot. This construction preserves the symmetry of the rotor core 45 and preserves the dynamic balance of the machine.

The first rotor winding 46 may be wound as a distributed winding on an ordinary winding machine just as if all 24 slots were present. The three sets of slot conductors in the enlarged slot 73 merely fall in place as they are wound and if there is some intermixing of these slot conductors no harmful effects are observed. On FIGURE 6 conductors 1 through 24 have been numbered and the solid lines indicate phase A and the dotted lines indicate phase B. Using 21 gauge wire a satisfactorily performing motor has been constructed using the number of turns in the following table.

| Coil No. | No. of Turns | Phase |
| --- | --- | --- |
| 1 | 74 | A |
| 2 | 74 | A |
| 3 | 115 | A |
| 4 | 115 | B |
| 5 | 74 | B |
| 6 | 74 | B |
| 7 | 74 | A |
| 8 | 74 | A |
| 9 | 115 | A |
| 10 | 115 | B |
| 11 | 74 | B |
| 12 | 74 | B |
| 13 | 74 | A |
| 14 | 74 | A |
| 15 | 115 | A |
| 16 | 115 | B |
| 17 | 74 | B |
| 18 | 74 | B |
| 19 | 74 | A |
| 20 | 74 | A |
| 21 | 115 | A |
| 22 | 115 | B |
| 23 | 74 | B |
| 24 | 74 | B |

This table of number of turns shows that the winding is not only distributed but graded for a more nearly sinusoidal flux field. The FIGURE 6 accordingly shows how the first rotor winding 46 may be wound in the slots to provide the four-pole, two-phase winding. The second rotor winding 47 has not been shown in FIGURE 6 in order to avoid complicating the drawing but this two-pole, three-phase winding 49 may be conventionally wound in an ordinary winding machine just as if the rotor core 45 had 24 slots. Accordingly this second rotor winding 47 would also be a distributed polyphase winding.

Figure 3:
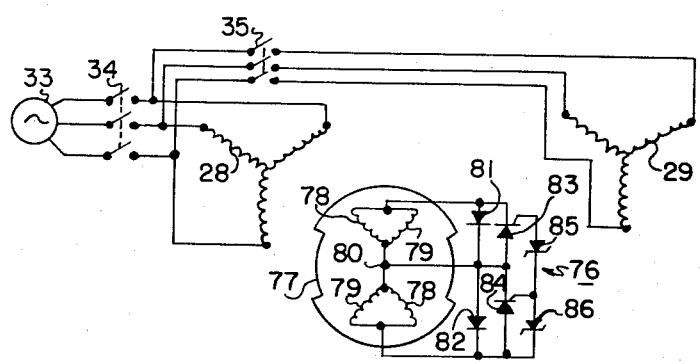

FIGURE 3 illustrates another embodiment of the invention in a synchronous machine 76 wherein the first and second stator windings 28 and 29 are again used. A single rotor core 77 is again illustrated. This rotor core 77 has been shown as having two salient poles and may be constructed as illustrated in FIGURE 3 or constructed with slots as in FIGURE 6. The rotor core 77 includes first and second two-phase rotor windings 78 and 79, respectively. The first phase winding 78 includes two coils wound diammetrically opposed on the core 77. The second phase winding 79 also includes first and second coils wound diammetrically opposed on the rotor core 77. The two windings 78 and 79 are interconnected at a junction 80 at the inner ends of all coils. The rotor windings 78 and 79 cooperate with the first stator winding 28 to act as a motor. The same rotor windings 78 and 79 also cooperate with the second stator winding 29 to act as an exciter. The rotor windings 78 and 79 are connected through rectifiers 81 and 82 so that a unidirectional current flows in them during synchronous operation. Semi-conductor controlled rectifiers 83 and 84 are connected in opposition to the rectifiers 81 and 82. Breakdown diodes such as Zener diodes 85 and 86 are connected to the gate electrodes of the controlled rectifiers 83 and 84, respectively.

The synchronous machine 76 is illustrated as a synchronous motor. The diode rectifiers 81 and 82 together with the reversely connected controlled rectifiers 83 and 84 provide a means for short circuiting the rotor windings 78 and 79 at least during induction motor starting of the machine 76. During this starting condition the voltage induced in the rotor windings 78 and 79 will be an alternating voltage which in one polarity will pass through the rectifiers 81 and 82 and in the opposite polarity will pass through the controlled rectifiers 83 and 84. These controlled rectifiers are triggered into firing condition whenever the voltage exceeds the breakdown voltage of these diodes 85 and 86. This breakdown voltage will be chosen to be of a relatively low value, for example 50 volts so as to be readily exceeded by the high induced voltage during starting. Such rectifier connections thus provide short-circuited rotor windings 78 and 79 to provide induction motor starting up to an induction motor speed. When the motor nears synchronous speed, the switch 35 will be closed to provide a rotating field established by the second stator winding 29. This rotating field may be of any number of poles so long as there is a relative rotation between the poles of the magnetic field established by stator winding 29 and the physically rotating speed of the rotor. This will induce a voltage in the rotor windings 78 and 79 in accordance with this difference of speed. Such induced voltage may be chosen to be of a voltage below the triggering voltage of the Zener diodes 85 and 86. For example 35 volts may be the induced voltage and accordingly the controlled rectifiers 83 and 84 are not triggered to fire. Accordingly a unidirectional current is caused to flow through the rotor windings 78 and 79 establishing a unidirectional field in the rotor core 77 which causes the rotor to pull-in to synchronism and run as a synchronous motor.

Figure 4:
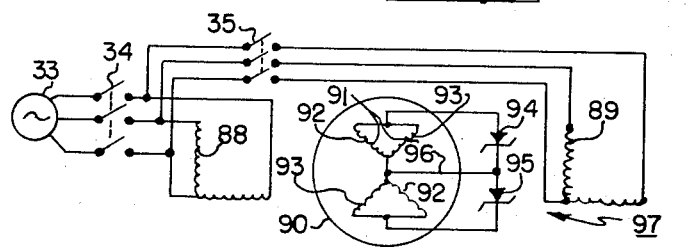

FIGURE 4 shows another modification wherein a synchronous machine 97 has first and second stator windings 88 and 89, shown as two-phase windings. The rotor core 90 coacting with these stator windings includes two-phase rotor winding means 91. This winding means 91 includes coils 92 and 93. These coils may be wound on a two-pole or a four-pole rotor core, for example, and a two-pole core is shown which may be similar to that shown in FIGURE 3 or may be of the slotted type shown in FIGURE 6. Breakdown diodes such as Zener diodes 94 and 95 are connected across coils 92 and 93. A common conductor 96 interconnects the inner ends of the two coils and the junction of the two diodes. The synchronous machine 97 of FIGURE 4 combines in a single two-phase rotor winding the functions of the motor winding and the exciter winding. Under running conditions at synchronous speed the second stator winding 89 induces a voltage in the rotor winding 91 because of the difference between the rotational speed of the magnetic field and the speed of the poles on the rotor core 90, as described for previous figures. This induced alternating voltage is rectified by the breakdown diodes 94 and 95 and applied to this same rotor winding 91 to develop a unidirectional flux in the rotor core 90 and thus act as the rotating field for synchronous motor action in conjunction with the first rotor winding 88.

The circuit of FIGURE 4 will establish an alternating current in the first rotor winding 91 by the alternating voltage induced therein during starting. This is because the breakdown diode 94 or 95 will conduct in the forward direction with only about a one volt drop across the diode. The breakdown diode 94 or 95 will conduct in the reverse direction whenever the breakdown voltage is exceeded and this may be in the order of 50 volts, for example. Accordingly there is an unbalance in the system but the breakdown diodes do in effect create a short circuit condition on the first rotor winding 91 so that an alternating current is produced which will develop starting torque. At synchronous running speed the induced voltage will be lower than the breakdown voltage of the diodes 94 and 95 and accordingly only unidirectional current will flow in the rotor winding 91.

Figure 5:
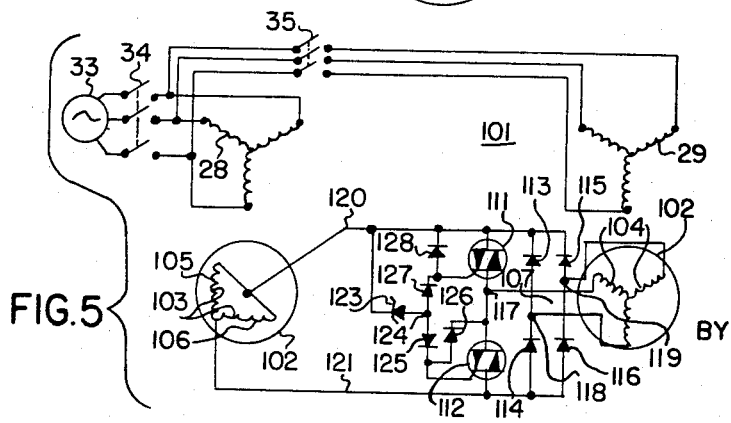

FIGURE 5 shows another embodiment of the invention incorporated in a synchronous machine 101. In this case the first and second stator windings 28 and 29 are shown as three-phase windings and the rotor includes a single rotor core 102 in this case shown as two separate circles. This single rotor core 102 includes the first and second rotor windings 103 and 104. The first rotor winding 103 is made up of two phase coils 105 and 106. This first rotor winding 103 is supplied through a bridge rectifier 107 from the three-phase second rotor winding 104.

The bridge rectifier 107 is a three-phase bridge rectifier including bidirectional controlled rectifiers 111 and 112 as well as diodes 113–116. The ends of the second rotor winding 104 are connected to junction terminals 117, 118, and 119 at the common connection between each pair of rectifiers. A conductor 120 connects the positive terminal of the bridge rectifier 107 to the first rotor winding 103 and a conductor 121 connects the negative terminal of the bridge rectifier to the other end of the first rotor winding 103. The bidirectional controlled rectifiers 111 and 112 each have a gate electrode which upon application of a triggering current in either direction will cause the rectifiers 111 and 112 to conduct in one direction or another depending upon which terminal has a positive voltage applied to it. These rectifiers may also be what is known as bidirectional triode thyristers. A breakdown diode 123 which may be a Zener diode is connected from the positive conductor 120 to a junction 124. This junction 124 is connected by a diode 125 to the gate of bidirectional rectifier 112 and also through diode 125 and a diode 126 to the junction 117. Additionally junction 124 is connected through the diode 127 and a diode 128 to the positive conductor 120.

In operation the circuit acts in a manner similar to the circuits of FIGURES 1–4. The motor is started by AC energization of the stator winding 28. An AC voltage is induced in the first rotor winding 103 and therefore conductor 120 is alternately positive and negative with respect to conductor 121. When conductor 120 is positive and exceeds the reference voltage established by the Zener diode 123, gate current will first be supplied to the bidirectional rectifier 112 turning it on, and immediately thereafter gate current can flow in bidirectional rectifier 111 to turn it on. The short circuit path for this polarity is then established. In the opposite polarity the short circuit path for the field winding 103 is established through diode rectifiers 113–116. Also controlled rectifiers 111 and 112 are triggered for this polarity and will conduct. Therefore the motor will accelerate.

When the motor has reached nearly synchronous speed the exciter winding 29 is energized and the diodes 113–116 act as in an ordinary full wave bridge. The only operation which requires analysis is when controlled rectifiers 111 and 112 are required to conduct. As stated above for this portion of the operation the voltage developed by the exciter rotor winding 104 is made less than the reference voltage or breakdown voltage of the Zener diode 123. When the junction 117 becomes more positive than conductor 120, that is when it is the proper turn for controlled rectifier 111 to deliver current from the bridge, the gate of controlled rectifier 111 is triggered by current passing through the gate of 111, through diode 128 to conductor 120 and then back through the field winding 103 and diodes 114 or 116. Rectifier 111 conducts and operates as if it were a rectifier until terminal 117 goes negative with respect to conductor 120 and the current is transferred to diode 113 or 115. Unlike a conventional semi-conductor controlled rectifier current passing the gate in either direction will trigger this bidirectional controlled rectifier. Diodes 127 and 126 keep the controlled rectifier 112 from being turned on at this time.

When terminal 117 becomes more negative than conductor 121 and controlled rectifier 112 is required to conduct, the gate of 112 is triggered by current passing from conductor 121 through the gate of rectifier 112 and through diode 126 to terminal 117. Then controlled rectifier 112 conducts and carries its share of the bridge current. Diodes 125 and 128 keep current from simultaneously passing through the gate of controlled rectifier 111 and turning it on at a time when terminal 117 is negative.

If, during synchronous speed operation, a transient voltage appears at conductor 120 which is of sufficient amplitude to trigger the controlled rectifiers 111 and 112, they will conduct until terminal 117 goes positive. At this time controlled rectifier 111 will cease to conduct followed by controlled rectifier 112 and the bridge will return to normal operation.

It will be understood that FIGURE 5 is an example of how the bidirectional controlled rectifiers can be incorporated into the bridge 107 which supplies direct current from the second rotor winding 104 to the first rotor winding 103. One such bidirectional controlled rectifier could be substituted for one of the rectifiers 40 in the circuit of FIGURE 1 and be triggered by the single Zener diode without the need for all of the protective diodes 125–128. Also if a single phase exciter winding 104 were to be used then a single bidirectional controlled rectifier could be connected between the motor and exciter rotor windings to supply alternating current during starting and unidirectional current during synchronous speed operation.

In each of the FIGURES 1 through 5 the first stator winding 28, 48, or 88 may be energized from any alternating current of any frequency, any number of poles and any number of phases including single phase. If single phase is used some phase displacement is necessary to provide starting torque if the synchronous machines are operated as synchronous motors. The first rotor windings 31, 46, 78, 91 and 103 will usually, according to conventional motor practice, be of the same number of poles as the stator winding. However they need not be of the same number of phases and may be either polyphase or single phase. If polyphase, no problem is encountered in developing starting torque. If the machines are operated as synchronous generators then single phase first rotor windings are entirely satisfactory.

The second stator windings 29, 49, and 89 may be energized from any suitable voltage source including alternating voltage single or multi-phase and any frequency and this includes zero frequency or a direct current source. The requirement is that a voltage be developed in the second rotor windings 32, 47, 79, 91 or 104 at or near synchronous speed operation. Because the rotor is physically turning the conductors of such windings will cut flux even if it is a stationary flux from a DC energized winding or if it is a single phase AC energized winding. This permits great flexibility in energization source for this second stator winding. The second stator winding may be of any number of poles and even may be of the same number of poles as the first stator winding 28, if backward rotation of one is established. What is required is that there be relative rotation between the physically rotating poles on the second rotor winding and the poles of the rotating or stationary field established by the second stator winding. Normally this may be provided in FIGURES 1 and 2 by utilizing a different number of poles on the first and second stator windings.

The second rotor windings 32, 47, 79, 91 and 104 will usually be of the same number of poles as the poles on the second stator winding, where this exciter is a frequency converter. However this is not mandatory because the second stator winding may be single phase or polyphase and the second rotor winding may be single phase or polyphase because the current is being rectified and applied as a unidirectional current to the first rotor winding.

The bridge rectifiers of FIGURES 2 and 5 are desirable and polyphase bridge rectifiers are especially desirable because such rectifiers will improve the form factor of the DC voltage impressed upon the motor field. Also these bridge rectifiers improve the ratio of the DC voltage output relative to the AC line-to-line voltage input. Both of these improvements result in a better utilization of the rotor winding space and consequently improved machine performance.

The excitation supplied to the first and second stator windings may be of the same frequency for convenience and ease of obtaining these source voltages or they may be of different frequencies. The magnetic isolation of the two windings permits them to be operated at different frequencies without interference.

The exciter has been described previously as a frequency converter. However, this exciter may also be an ordinary AC generator with a DC field and windings on the rotor which develop an AC voltage by cutting this DC field. In this case the AC voltage is rectified and applied as a DC voltage to the first rotor winding acting as a DC field for synchronous motor action.

The winding shown in FIGURE 6 has a number of advantages because it permits winding of a two-phase field winding which is balanced, that is, it has the same mean length of turn and copper area in each pole phase group. This winding also has a minimum of harmonics in the flux field because it is a graded winding namely it has a different number of turns in the different coils. It can be wound either full pitch or less than full pitch and is shown as ⅚ pitch. Further this winding 46 is free of any physical interference between the end turns of the two phase groups in the winding. There would be physical interference in the end turns if this field coil 46 were wound as coils encircling the entire salient pole piece.

The present disclosure includes that contained in the appended claims, as well as that of the foregoing description. Although this invention has been described in its preferred form with a certain degree of particularity it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:
1. A synchronous machine, comprising, in combination,
   stator core means,
   a single magnetically permeable rotor core journalled relative to said stator core means,
   stator winding means wound on said stator core means,
   rotor winding means on said single rotor core,
   at least a part of said stator and rotor winding means acting as a synchronous machine operable at a synchronous speed dependent on the number of poles in said stator winding means and with said part of said rotor winding means acting as a field winding,
   at least a part of said stator and rotor winding means operable as an exciter to generate a voltage in the rotor exciter winding,
   rectifier means connecting said rotor exciter and field windings,
   and said generated voltage being rectified by said rectifier means and applied to said rotor field winding to cause operation of said machine at said synchronous speed.

2. A synchronous machine as defined in claim 1 wherein said stator winding means includes first and second windings cooperating with said rotor field and exciter windings, respectively.

3. A synchronous machine as defined in claim 1 wherein said stator winding means includes first and second stator windings, and said first stator winding is polyphase and the field thereof is rotating either forward or backward relative to the magnetic field established by said second stator winding.

4. A synchronous machine as defined in claim 1 wherein said stator winding means includes first and second stator windings, and said first and second stator windings are energized with alternating current at the same frequency.

5. A synchronous machine as defined in claim 1 wherein said stator winding means includes first and second stator windings, said rotor winding means includes first and second rotor windings, and said first stator and rotor windings are polyphase windings.

6. A synchronous machine as defined in claim 1 wherein said stator winding means includes first and second stator windings, said rotor winding means includes first and second rotor windings, and said first stator and rotor windings are polyphase windings of the same number of poles.

7. A synchronous machine as defined in claim 1 wherein said stator winding means includes first and second stator windings, and said second stator winding means is a polyphase winding having a different number of poles from the poles of said first stator winding.

8. A synchronous machine as defined in claim 1 wherein said stator winding means includes first and second stator windings on said stator core means, said rotor winding means includes first and second rotor windings, said second windings are a frequency converter, and said first and second stator windings having a different number of poles.

9. A synchronous machine as defined in claim 1 wherein said stator winding means includes first and second stator windings, said rotor winding means includes first and second rotor windings, and said exciter windings are a frequency converter and the second rotor winding, when mechanically driven at synchronous speed by the first rotor winding, has a different rotational speed from the magnetically rotating field of said second stator winding.

10. A synchronous machine as defined in claim 1 wherein said stator winding means includes first and second stator windings,
   said rotor winding means includes first and second rotor windings,
   said first windings act as a motor and said second windings act as a frequency converter, said first and second stator windings having a ratio of poles therebetween which include all ratios except 3:1, 5:1, 7:1 ... n:1, at least said first stator winding being polyphase, said polyphase first stator winding having phase groups with at least part of these phase groups connected in series, and said series connections of windings being connected so as to give zero voltage across the series connected windings with respect to voltage induced into said first stator winding from said second stator or rotor windings.

11. A synchronous machine as defined in claim 1 wherein said stator winding means includes first and second stator windings, said rotor winding means includes first and second rotor windings, and said second windings have the same number of phases on the stator and rotor windings.

12. A synchronous machine as defined in claim 1 wherein said stator winding means includes first and second stator windings, and one of said first and second stator windings are two-pole windings and the others are four-pole windings.

13. A synchronous machine as defined in claim 1 wherein said rotor winding means includes first and second rotor windings, said first rotor winding has two parts, said first part being short circuited upon itself and said second part being connected through said rectifier means to said second rotor winding.

14. A synchronous machine as defined in claim 1 wherein said single rotor core is a laminated core having four large slots therein symmetrically disposed to establish four salient poles, small slots generally symmetrically disposed in each of said salient poles, and said rotor winding means being distributed windings in said large and small slots.

15. A synchronous machine as defined in claim 1 wherein said single rotor core is a laminated core having an even plurality of large slots therein symmetrically disposed to establish said even plurality of salient poles, small slots generally symmetrically disposed in each of said salient poles, said rotor winding means includes first and second rotor windings, and said first and second rotor windings being distributed windings in said large and small slots and being polyphase windings with some of said windings being short circuited for starting as an induction motor.

16. A synchronous machine as defined in claim 1 wherein said rotor winding means includes first and second rotor windings, and said second rotor winding is a three-phase winding and said rectifier means includes three half-wave rectifiers.

17. A synchronous machine as defined in claim 1 wherein said rotor winding means includes first and second rotor windings, and said second rotor winding is a three-phase winding and said rectifier means includes six individual rectifiers connected in a three-phase bridge.

18. A synchronous machine as defined in claim 1 wherein said rotor winding means includes first and second rotor windings, said first and second rotor windings each have two coils and all four coils are interconnected at a common point.

19. A synchronous machine as defined in claim 1 wherein said rectifier means include breakdown diodes connected in parallel with said rotor winding means.

20. An excited field, brushless, synchronous machine, comprising, in combination, stator core means, a single rotor core journalled relative to said stator core means, a first polyphase primary winding wound on said stator core, a first polyphase secondary winding on said rotor core, means to effectively short circuit said rotor winding to establish induction motor starting up to running speed of said rotor upon energization of said polyphase primary winding from a source of AC power, a second polyphase primary winding wound on said stator core means of a different number of poles from said first primary winding, a second polyphase winding wound on said single rotor core to act as a frequency converter by generator action upon rotation of said rotor and energization of said second primary winding, rectifier means connecting said first and second rotor windings, means to energize said second stator winding after said rotor is up to induction motor speed to thus generate a voltage in said second rotor winding, and said generated voltage being rectified by said rectifier means and applied to said first rotor winding as a field winding to cause said rotor to run as a synchronous motor at a synchronous speed determined by the frequency of said AC power supply.

21. A synchronous machine as defined in claim 1, wherein said rectifier means includes a bidirectional controlled rectifier.

22. A synchronous machine as defined in claim 1, wherein said rotor winding means includes first and second rotor windings, said rectifier means includes a bidirectional controlled rectifier having a control electrode, and a breakdown diode connected to said electrode to have said bidirectional controlled rectifier conduct in a first direction then in the opposite direction upon impression of an alternating voltage thereon plus being triggered into conduction by a voltage applied to said breakdown diode in excess of the breakdown voltage value thereof.

References Cited

UNITED STATES PATENTS

| | | | |
|---|---|---|---|
| 2,832,407 | 4/1958 | McConnell | 318—186 X |
| 3,100,279 | 8/1963 | Rohner | 318—193 X |
| 3,350,613 | 10/1967 | Brockman et al. | 318—193 X |

ORIS L. RADER, *Primary Examiner.*

G. Z. RUBINSON, *Assistant Examiner.*